United States Patent
Tadokoro et al.

(10) Patent No.: US 11,493,648 B2
(45) Date of Patent: Nov. 8, 2022

(54) RADIATION MONITOR AND METHOD FOR MEASURING RADIATION

(71) Applicant: HITACHI, LTD., Tokyo (JP)

(72) Inventors: Takahiro Tadokoro, Tokyo (JP); Yuichiro Ueno, Tokyo (JP); Katsunori Ueno, Tokyo (JP); Kouichi Okada, Tokyo (JP); Shuichi Hatakeyama, Tokyo (JP); Yasushi Nagumo, Tokyo (JP); Tooru Shibutani, Tokyo (JP); Keisuke Sasaki, Tokyo (JP); Akira Oozone, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/276,957

(22) PCT Filed: Aug. 2, 2019

(86) PCT No.: PCT/JP2019/030499
§ 371 (c)(1),
(2) Date: Mar. 17, 2021

(87) PCT Pub. No.: WO2020/075374
PCT Pub. Date: Apr. 16, 2020

(65) Prior Publication Data
US 2022/0035055 A1    Feb. 3, 2022

(30) Foreign Application Priority Data

Oct. 12, 2018  (JP) .............................. JP2018-193330

(51) Int. Cl.
*G01T 1/20* (2006.01)
*G01T 1/202* (2006.01)
(Continued)

(52) U.S. Cl.
CPC ............ *G01T 1/2002* (2013.01); *G01T 1/208* (2013.01); *G01T 1/2023* (2013.01); *G01T 3/06* (2013.01)

(58) Field of Classification Search
CPC ..... G01T 1/2002; G01T 1/2023; G01T 1/208; G01T 3/06
See application file for complete search history.

(56) References Cited

U.S. PATENT DOCUMENTS 5,289,510 A * 2/1994 Mihalczo ............... G21C 17/10
376/253
6,392,236 B1    5/2002 Maekawa et al.
(Continued)

FOREIGN PATENT DOCUMENTS

CN         1222781 C     10/2005
EP      2 071 359 A2     6/2009
(Continued)

OTHER PUBLICATIONS

International Search Report of PCT/JP2019/030499 dated Sep. 17, 2019.
(Continued)

*Primary Examiner* — Hugh Maupin
(74) *Attorney, Agent, or Firm* — Mattingly & Malur, PC

(57) ABSTRACT

A radiation monitor includes a radiation detection unit detecting radiation, and an optical fiber transmitting photons emitted from a light emitting element of the radiation detection unit, wherein the radiation detection unit includes a first light emitting element generating a photon in response to incident radiation, a chemical compound part having chemical compounds which generate charged particles by nuclear reactions with incident neutrons, and a second light emitting element being located between the first light emit-
(Continued)

ting element and the chemical compound part and generating a photon in response to radiation.

13 Claims, 4 Drawing Sheets

(51) Int. Cl.
*G01T 1/208* (2006.01)
*G01T 3/06* (2006.01)

(56) References Cited

U.S. PATENT DOCUMENTS

| | | | |
|---|---|---|---|
| 2006/0054863 A1* | 3/2006 | Dai | G21K 4/00 252/301.4 R |
| 2017/0315241 A1 | 11/2017 | Tadokoro et al. | |
| 2018/0172852 A1 | 6/2018 | Newman | |
| 2019/0204457 A1 | 4/2019 | Tadokoro et al. | |

FOREIGN PATENT DOCUMENTS

| | | |
|---|---|---|
| EP | 3321714 A1 | 5/2018 |
| EP | 3441793 A1 | 2/2019 |
| JP | 63-032390 A | 2/1988 |
| JP | 2013-160625 A | 8/2013 |
| JP | 2016-114392 | 6/2016 |
| JP | 2016-114392 A | 6/2016 |
| JP | 2016-151447 A | 8/2016 |
| JP | 6012171 B2 | 10/2016 |
| JP | 2017-15662 A | 1/2017 |
| JP | 2018-036204 A | 3/2018 |
| JP | 6452425 A | 1/2019 |
| WO | 2017/175763 A1 | 10/2017 |

OTHER PUBLICATIONS

Extended European Search Report received in corresponding European Application No. 19871750.6 dated Jun. 9, 2022.

\* cited by examiner

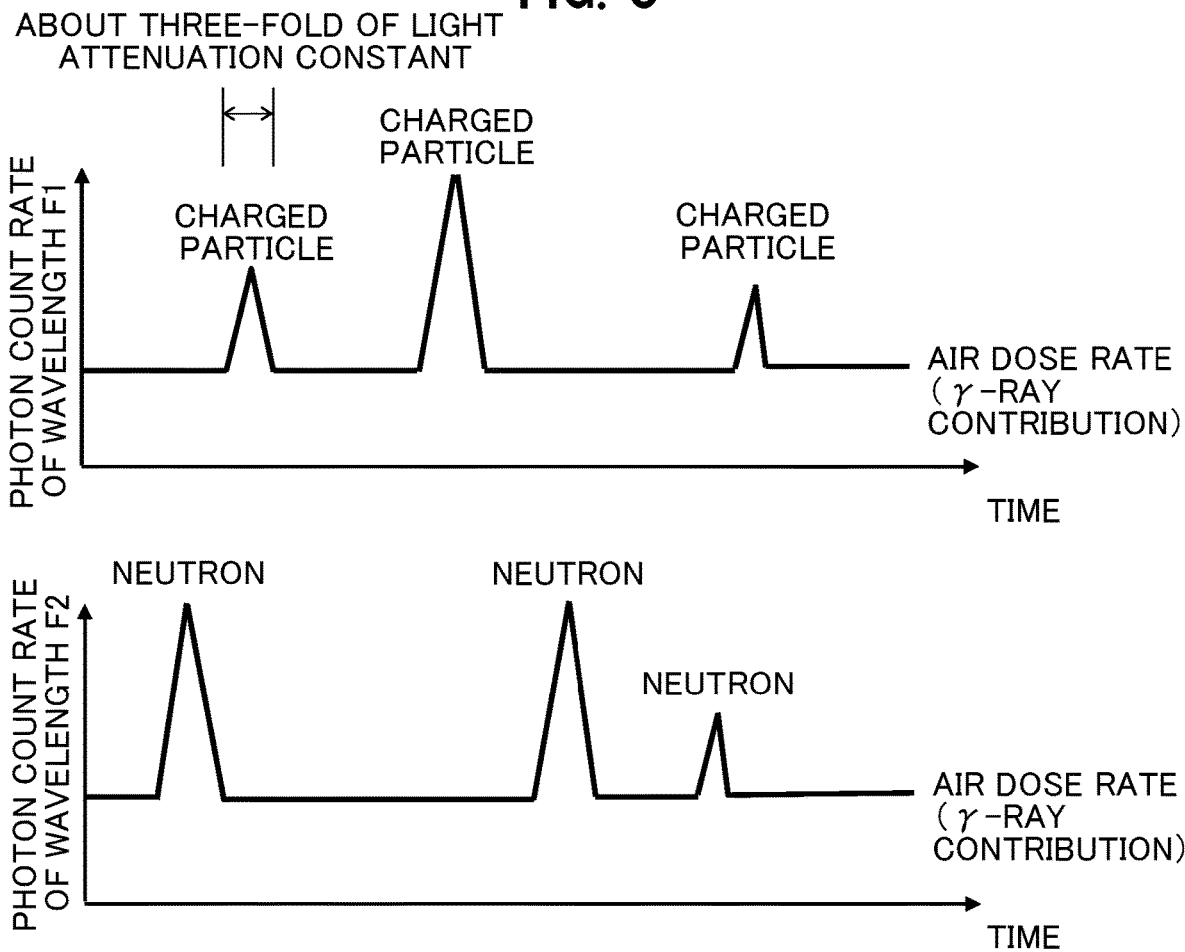
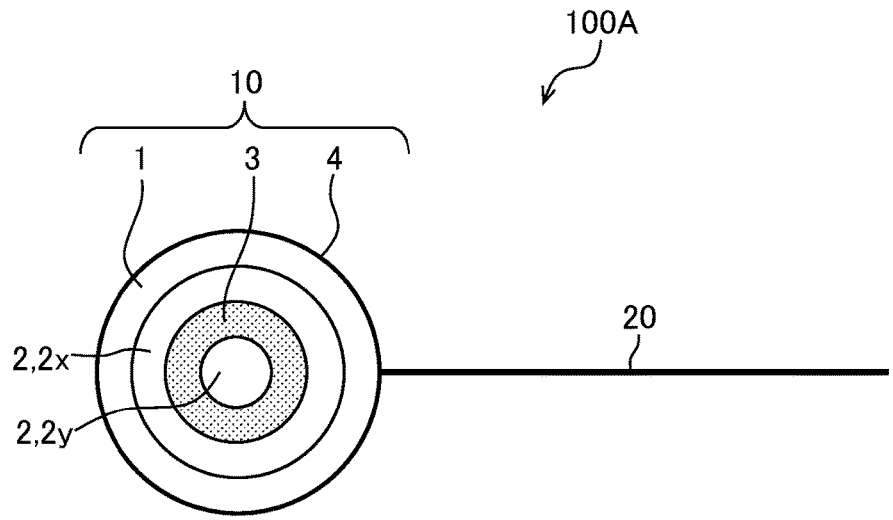

RADIATION MONITOR AND METHOD FOR MEASURING RADIATION

TECHNICAL FIELD

The present invention relates to a radiation monitor that measures air dose rates, charged particles, and neutrons and a method for measuring radiation.

BACKGROUND ART

Conventional charged particle detectors include a gas detector, a scintillation detector, and a semiconductor detector. A gas detector is a detector that has a structure such that a metal wire is placed inside a gas-sealed container, and generates electrons when a charged particle ionizes the gas inside the detector, amplifies the electrons in a high electric field domain near the metal wire, and thereby measures the electrons as electric signals.

A scintillation detector has a scintillation element configured to emit light when a charged particle enters the scintillation element, converts the light emission into an electric signal using a photomultiplier tube or the like, and measures the charged particle based on the electric signal. When a single charged particle enters the scintillation element, a large number of photons are generated and the number of the photons generated is proportional to the energy of the incident charged particle. Thus, it is possible to measure the energy of the incident charged particles by measuring the peak values of a pulsed electric signals which is proportional to the number of photons generated.

A semiconductor detector is a detector that detects a charged particle based on an electric signal generated when electrons and holes of electron-hole pairs generated by ionization of the charged particle travel to the p-type and to the n-type, respectively, in a domain formed around the surface junction of a p-type semiconductor and an n-type semiconductor (a depletion layer) where almost no electron or hole exists.

Meanwhile, conventional neutron detectors include, like charged particle detectors, a gas detector, a scintillation detector, and a semiconductor detector. A gas detector as a neutron detector has a structure such that a metal wire is placed in a container in which a gas is sealed, and generates a charged particle in a nuclear reaction with a neutron in helium-3, boron trifluoride, or the like. The gas detector is a detector that generates electrons when the charged particle generated in the nuclear reaction with a neutron in the detector ionizes the gas in the detector, amplifies the electrons in a high electric field domain near the metal wire, and thereby measures the electrons as an electric signal.

A scintillation detector as a neutron detector mixes, into a scintillation element, an element such as lithium or boron that generates a charged particle in a nuclear reaction with a neutron, so that the charged particle generated in the nuclear reaction with a neutron in the detector causes the scintillation element to emit light, converts the light emission into an electric signal using a photomultiplier tube or the like, and measures neutrons based on the electric signals.

A semiconductor detector as a neutron detector is a detector that detects neutrons as follows. An element such as lithium or boron that generates a charged particle in a nuclear reaction with a neutron is applied to a semiconductor surface that neutrons enter. Neutrons are detected based on electric signals generated when electrons and holes of electron-hole pairs generated by ionization of the charged particle generated as a result of a nuclear reaction with a neutron and the element travel to the p-type and to the n-type, respectively, in a domain formed around the surface junction of a p-type semiconductor and an n-type semiconductor (a depletion layer) where almost no electron or hole exists.

CITATION LIST

Patent Literature

Patent Literature 1: Japanese Patent Application Publication No. 2017-15662
Patent Literature 2: Japanese Patent Application Publication No. 2016-114392

SUMMARY OF INVENTION

Technical Problem

Conventionally, detectors capable of measuring charged particles and neutrons separately have existed, but detectors capable of measuring both of neutrons and charged particles are not yet in actual use.

There have been devised radiation monitors that use an optical fiber capable of measuring air dose rates. In the radiation monitors, light emitted from a radiation detecting element is transmitted through the optical fiber, and air dose rates are measured based on the count rates of each and every photon (see Patent Literatures 1 and 2). However, such radiation monitors measure only air dose rates, and do not measure charged particles and neutrons.

The present invention has been made to solve the above problem, and has an object to provide a radiation monitor and a method for measuring radiation remotely and easily measuring air dose rates, charged particles, and neutrons separately.

Solution to Problem

To solve the above problems, a radiation monitor of the present invention is characterized in that the radiation monitor includes a radiation detection unit that detects radiation and a photon transmission unit that transmits photons emitted from a light emitting element of the radiation detection unit, in which the radiation detection unit includes a first light emitting element that generates photons in response to incident radiation, a compound part having a compound that generates charged particle in nuclear reactions with incident neutrons, and a second light emitting element that generates photons in response to radiation, the second light emitting element being located between the first light emitting element and the compound part. Other aspects of the present invention will be described in the embodiments provided below.

Advantageous Effects of Invention

The present invention may remotely and easily measure air dose rates, charged particles, and neutrons separately.

BRIEF DESCRIPTION OF DRAWINGS

FIG. 3 is a diagram illustrating an example of how the photon count rate of an emission wavelength F1 and the photon count rate of an emission wavelength F2 change over time in the radiation monitor and the method for measuring radiation of the first embodiment.

FIG. 4 is a diagram illustrating an example of a radiation detection unit in a radiation monitor and a method for measuring radiation according to a second embodiment.

DESCRIPTION OF EMBODIMENTS

Embodiments of the present invention will be described in detail with reference to the drawings where necessary.

First Embodiment

Figure 1:
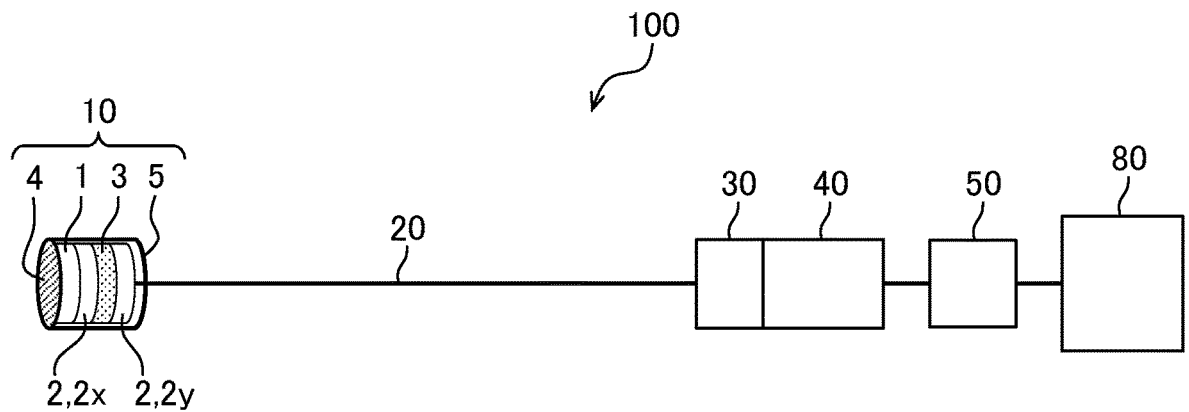
FIG. 1 is a diagram illustrating an example of a radiation monitor and a method for measuring radiation according to a first embodiment.

FIG. 1 is a diagram illustrating an example of a radiation monitor and a method for measuring radiation according to a first embodiment. As shown in FIG. 1, a radiation monitor 100, schematically, includes a radiation detection unit 10, an optical fiber 20 (a photon transmission unit), a wavelength differentiating unit 30, a light detection unit 40, a measurement device 50, and an analysis and display device 80. Examples of radiation that is measured by the radiation monitor 100 include electromagnetic waves such as x-rays and y-rays and particle beams such as α-rays, β-rays, and neutron beams.

The radiation detection unit 10 is an element that has a light-shielding thin film 4, a first light emitting element 1 that generates photons in response to incident radiation, a second light emitting element 2 (2x) that generates photons in response to incident radiation, a compound part 3 having compounds which generate charged particles in nuclear reactions with incident neutrons, and a second light emitting element 2 (2y) that generates photons in response to incident radiation. The second light emitting element 2y may be omitted.

The radiation detection unit 10 is desirably shielded from light by means of a radiation detection unit housing 5 to differentiate light from the first light emitting element 1 and the second light emitting element 2 from light coming from the outside. The radiation detection unit housing 5 is a container that houses the radiation detection unit 10. The material for the radiation detection unit housing 5 is not limited as long as radiation to be measured penetrates the material. For example, aluminum, stainless steel, or the like may be employed. Namely, the radiation monitor 100 of the present embodiment is such that the radiation detection unit 10 (e.g., the first light emitting element 1, the second light emitting elements 2, the compound part 3) is housed in the radiation detection unit housing 5. The light-shielding thin film 4 does not need to be used if a measurement is conducted in an environment where no photon having the same emission wavelengths as those of the light emitted by the first light emitting element 1 and the light emitted by the second light emitting element 2 exists.

The first light emitting element 1 and the second light emitting elements 2 are not limited as long as each of them is a composition that exhibits luminescence, such as photoluminescence in response to light like ultraviolet rays, radioluminescence in response to radiation, cathodoluminescence in response to an electron beam, electroluminescence in response to an electric field, and chemiluminescence as the result of a chemical reaction. Specifically, the first light emitting element 1 and the second light emitting elements 2x, 2y may be, for example, as a matrix material, a light transmissive material such as NaI, CsI, LiI, $SrI_2$, $Bi_4Ge_3O_{12}$, $Bi_4Si_3O_{12}$, $CdWO_4$, $PbWO_4$, ZnS, $CaF_2$, LuAG, LuAP, $Lu_2O_3$, $Y_3Al_5O_{12}$ (yttrium aluminum garnet), $YAlO_3$, $Lu_2SiO_5$, LYSO, $Y_2SiO_5$, $Gd_2SiO_5$, $BaF_2$, $CeF_3$, $CeBr_3$, CsF, LiF, $Gd_2O_2S$, $LaBr_3$, $CeBr_3$, $Gd_3Al_2Ga_3O_{12}$, $Cs_2LiYCl_6$, $ScTaO_4$, $LaTaO_4$, $LuTaO_4$, $GdTaO_4$, or $YTaO_4$ or a light transmissive material containing, in the above light transmissive material, a rare-earth element such as La, Ce (cerium), Pr (praseodymium), Nd (neodymium), Sm, Eu, Gd, Tb, Dy, Ho, Er, Tm, Yb (ytterbium), Lu, or Y, an element such as Tl, Na, Ag, W, or $CO_3$, or a powder fluorescent material. The valence of the element contained in the first light emitting element 1 and the second light emitting element 2 is not limited as long as it is used for light emission, and may be, for example, 1, 2, 3, 4, or the like.

A method for manufacturing the first light emitting element 1 and the second light emitting element 2 is not limited as long as the method grows a composition exhibiting luminescence, and for example, the floating zone method, the Czochralski method (the pulling method), the micro-pulling-down method, the Bridgman method, the Verneuil method, or the like may employ as the method.

The compound part 3 is placed between the first light emitting element 1 and the optical fiber 20. The compounds are compound of boron or lithium which generate charged particles in nuclear reactions with neutrons and are optically transparent (light having the wavelengths of light emitted by the radiation light emitting elements goes through). Examples of the compounds include boron nitride (BN), borosilicate glass containing 5% to 30% of boron oxide ($B_2O_3$), and lithium fluoride (LiF). The second light emitting elements 2x, 2y, each of which is formed by addition of a rare-earth element to a ceramic matrix and have a different emission wavelength from the first light emitting element 1, are placed on the respective sides of the compound part 3.

When a gamma ray enters the first light emitting element 1 and the second light emitting element 2, photons having the emission wavelength of the first light emitting element 1 and photons having the emission wavelength of the second light emitting element 2 are generated.

When a charged particle (e.g., an a-ray) enters the first light emitting element 1, photons having the emission wavelength of the first light emitting element 1 are generated. Photons generated by the first light emitting element 1 go through the second light emitting element 2x, the compound part 3, and the second light emitting element 2y, and enter the optical fiber 20. The thickness of the first light emitting element 1 may be about the same as the range of a charged particle.

Since the second light emitting element 2 is shielded from charged particles by the radiation detection unit housing 5, charged particles do not enter the second light emitting element 2. Thus, charged particles (e.g., α-rays) stop in the first light emitting element 1. The thickness of the second light emitting element 2 is set to be about the same as the range of to-be-measured charged particles in the radiation light emission element. The thickness of the second light emitting element 2 may be about the same as the range of charged particles, which generated by the compound part 3, in the light emission element. Then, charged particles generated by the compound part 3 stop in the second light emitting element 2 and do not enter the first light emitting element 1.

Neutrons are not absorbed by the first light emitting element 1, and easily pass through the radiation detection unit housing 5. Thus, neutrons pass through the radiation detection unit housing 5 and enter the compound part 3. The compound part 3 generates charged particles (e.g., an α-ray) in nuclear reactions with incident neutrons. The compounds are, as described earlier, compounds of boron, lithium, or the like which are optically transparent (photons generated by the radiation light emitting elements go through).

The charged particles thus generated enter the second light emitting elements 2 (2x, 2y) placed at the respective sides of the compound part 3, and photons having the emission wavelength of the second light emitting element 2 are generated. Note that photons generated by the first light emitting element 1 and photons generated by the second light emitting elements 2 have different emission wavelengths from each other.

The photons generated by the first light emitting element 1 and the second light emitting element 2 go through the optical fiber 20 and are sent to the wavelength differentiating unit 30 formed by a wavelength-selection filter, a spectroscope, or the like. Photons differentiated by using wavelengths by the wavelength differentiating unit 30 are converted into electric signals in the light detection unit 40 placed at a stage after the wavelength differentiating unit 30. The measurement device 50 measures count rates of electric signals for each wavelength.

For example, a photomultiplier tube, an avalanche photodiode, or the like is employed as the light detection unit 40. By using the photomultiplier tube or the like, a single photon is detected as a single current pulse signal amplified in current. For example, a digital signal processor or the like is employed as the measurement device 50.

The analysis and display device 80 is apparatus which is connected to the measurement device 50 and displays values obtained by converting count rates of electric pulse signals counted by the measurement device 50 into dose rates of radiation. The analysis and display device 80 includes components such as a storage device that holds a database making count rates of electric pulse signals correspond to dose rates of radiation, an arithmetic device that converts count rates of electric pulse signals into dose rates of radiation using the database, and a display device that displays the dose rates of radiation thus obtained by the conversion. The analysis and display device 80 may be, for example, a personal computer or the like having the above-described capabilities.

Figure 2:
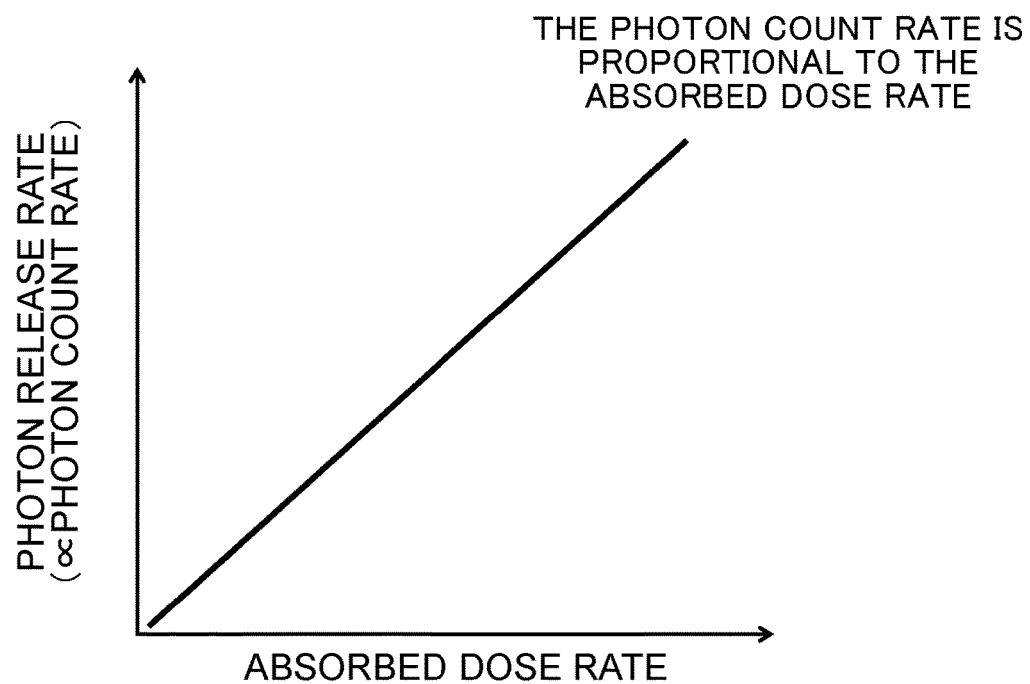
FIG. 2 is a diagram illustrating an example of photoemission characteristics relative to the absorbed dose rate of the radiation light emitting element employed in the first embodiment.

FIG. 2 is a diagram showing an example of photoemission characteristics relative to the absorbed dose rate of the radiation light emitting elements employed in the first embodiment. The inventors have found by experiment that a count rate of each and every photon and an absorbed dose rate in the light emitting element have a one-to-one relation.

FIG. 3 is a diagram showing an example of how the photon count rate of an emission wavelength F1 and the photon count rate of photons of an emission wavelength F2 change over time in the radiation monitor and a method for measuring radiation of the first embodiment. The photons generated by the first light emitting element 1 (the emission wavelength F1) and the photons generated by the second light emitting element 2 (the emission wavelength F2) are different; hence, they are measured separately.

The absorbed dose rates of gamma rays are smaller than the absorbed dose rates of charged particles by several digits or more. When a dose rate is constant, there is almost no temporal change in the count rate, and the count rate is almost constant. However, when a charged particle enters, the absorbed dose rate drastically increases, which causes a drastic increase in the count rate, and the count rate returns to what it was before the entrance of the charged particle in a period of time which is approximately several times the light attenuation constant of the first light emitting element 1 and the second light emitting element 2. Measuring a temporal change of such an increase and a decrease allows measurement of each and every charged particle.

Neutrons are measured indirectly by detecting charged particles generated in nuclear reactions with neutrons, in the same manner as the detection of charged particles.

Charged particles are measured based on temporal changes in the count rates regarding the emission wavelength F1, and neutrons are measured based on temporal changes in the count rates regarding the emission wavelength F2. Moreover, air dose rates are measured based on the count rates regarding the emission wavelength F1 or the emission wavelength F2. Thus, the present embodiment measures air dose rates, charged particles, and neutrons separately.

Second Embodiment

FIG. 4 is a diagram showing an example of a radiation detection unit in a radiation monitor and a method for measuring radiation according to a second embodiment. The radiation detection unit 10 of a radiation monitor 100A has a nested structure of the first light emitting element 1, the second light emitting element 2x, the compound part 3, and the second light emitting element 2y, and the first light emitting element 1, the second light emitting element 2x, and the compound part 3 are shaped like spherical shells. The second light emitting element 2y may be shaped like either a spherical shell or a spherical solid.

The spherical-shell first light emitting element 1 and second light emitting element 2x each have about the same thickness as the range of to-be-measured charged particles in the light emitting element. Thereby, charged particles from the outside stop in the first light emitting element 1. Charged particles generated by the compound part 3 stop in the second light emitting element 2x. Thus, charged particles generated by the compound part 3 do not enter the first light emitting element 1.

The second light emitting element 2y and the second light emitting element 2x are placed inside and outside the spherical-shell compound part 3, respectively. The spherical-shell first light emitting element 1 is placed outside the second light emitting element 2x. The light-shielding thin film 4 made of metal or the like is used to shield the outside of the first light emitting element 1 from light. In a case where, a measurement is conducted in an environment where no photon having the same emission wavelength as wavelengths of the light emitted by the first light emitting element 1 and the light emitted by the second light emitting element 2 exists, the light-shielding thin film 4 does not have to be used.

When a charged particle enters the first light emitting element 1, photons with the wavelength of the emission wavelength F1 of the first light emitting element 1 are generated. The charged particle does not enter the second light emitting element 2 because charged particles are shielded by the first light emitting element 1. Since neutrons easily go through the first light emitting element 1 and the second light emitting element 2, a neutron enters the compound part 3 having compounds which generate charged particles in nuclear reactions with neutrons, via the first light emitting element 1 and the second light emitting element 2, resulting in generating charged particles. As described earlier, the compounds are compounds of boron, lithium, or the like which are optically transparent (photons generated by the first light emitting element 1 and the second light emitting elements 2 go through). The each second light emitting elements 2 is a light emitting element formed by addition of a rare-earth element to a ceramic matrix having a different emission wavelength from the wavelength of the first light emitting element 1.

The charged particle generated enters the second light emitting element 2 placed outside or inside the compound part 3, and photons having the wavelength of the emission wavelength F2 of the second light emitting element 2 are generated. Photons generated by the first light emitting element 1 and the second light emitting element 2 are sent to the wavelength differentiating unit 30 through the optical fiber 20. Photons are differentiated by using wavelengths by the wavelength differentiating unit 30, and are converted into electric signals by the light detection unit 40 placed at a stage after the wavelength differentiating unit 30. The measurement device 50 measures count rates of the electric signals for each wavelength.

Like the first embodiment, the second embodiment measures air dose rates, charged particles, or neutrons by measuring temporal changes in the count rates of photons with the emission wavelength F1 or the emission wavelength F2.

Third Embodiment

Figure 5:
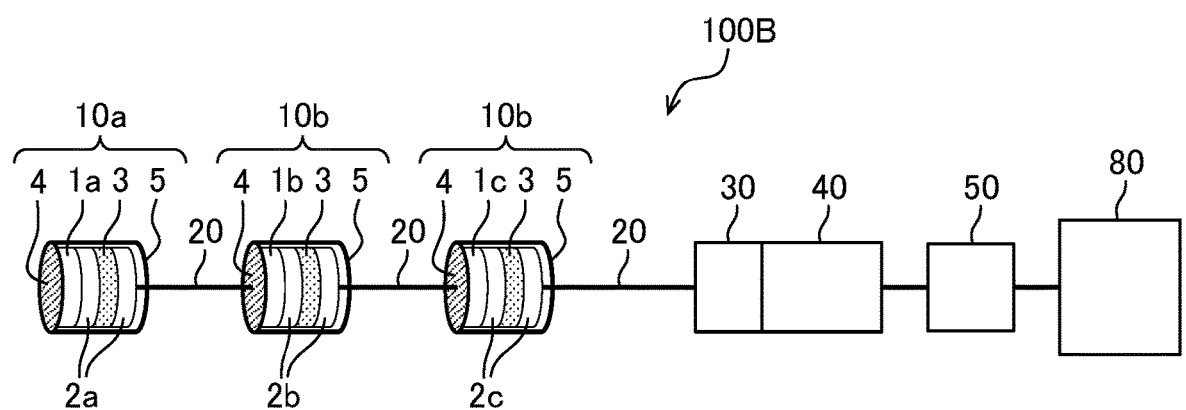
FIG. 5 is a diagram illustrating an example of a radiation monitor and a method for measuring radiation according to a third embodiment.

FIG. 5 is a diagram showing an example of a radiation monitor and a method for measuring radiation according to a third embodiment. A radiation monitor 100B of the third embodiment has a plurality of radiation detection units 10 shown in FIG. 1. The radiation monitor 100B has radiation detection units 10a, 10b, 10c which are connected in series by the optical fiber 20. To the radiation detection unit 10a, the radiation detection units 10b, 10c are the other radiation detection units.

The radiation detection unit 10a is, as it is in FIG. 1, an element that has the light-shielding thin film 4, a first light emitting element 1a that generates photons in response to incident radiation, second light emitting elements 2a that generate photons in response to incident radiation, and the compound part 3 having a compound that generates charged particles in nuclear reactions with incident neutrons. The light-shielding thin film 4, the first light emitting element 1a, the second light emitting elements 2a, and the compound part 3 are placed inside the radiation detection unit housing 5.

The radiation detection unit 10b is, as it is in FIG. 1, an element that has the light-shielding thin film 4, a first light emitting element 1b that generates photons in response to incident radiation, second light emitting elements 2b that generate photons in response to incident radiation, and the compound part 3 having compounds which generate charged particles in nuclear reactions with incident neutrons. The light-shielding thin film 4, the first light emitting element 1b, the second light emitting elements 2b, and the compound part 3 are placed inside the radiation detection unit housing 5.

The radiation detection unit 10c is, as it is in FIG. 1, an element that has the light-shielding thin film 4, a first light emitting element 1c that generates photons in response to incident radiation, second light emitting elements 2c that generate photons in response to incident radiation, and the compound part 3 having compounds which generate charged particles in nuclear reactions with incident neutrons. The light-shielding thin film 4, the first light emitting element 1c, the second light emitting elements 2c, and the compound part 3 are placed inside the radiation detection unit housing 5.

The first light emitting element 1 (1a, 1b, 1c) and the second light emitting elements 2 (2a, 2b, 2c) used in each of the radiation detection units have different emission wavelengths from each other. The first light emitting elements 1a, 1b, 1c may have different emission wavelengths from one another, or may have the same emission wavelength. Similarly, the second light emitting elements 2 (2a, 2b, 2c) may have different emission wavelengths from one another, or may have the same emission wavelength.

When light emitting elements with different emission wavelengths are used, measuring a temporal change in the photon count rate of each emission wavelength allows measurement of charged particles at each of the locations where the first light emitting elements 1 are placed. Also, neutrons may be measured at the locations where the second light emitting elements 2 are placed. In addition, placing a plurality of second light emitting elements 2 closely together improves efficiency of detecting charged particles and neutrons.

Fourth Embodiment

Figure 6:
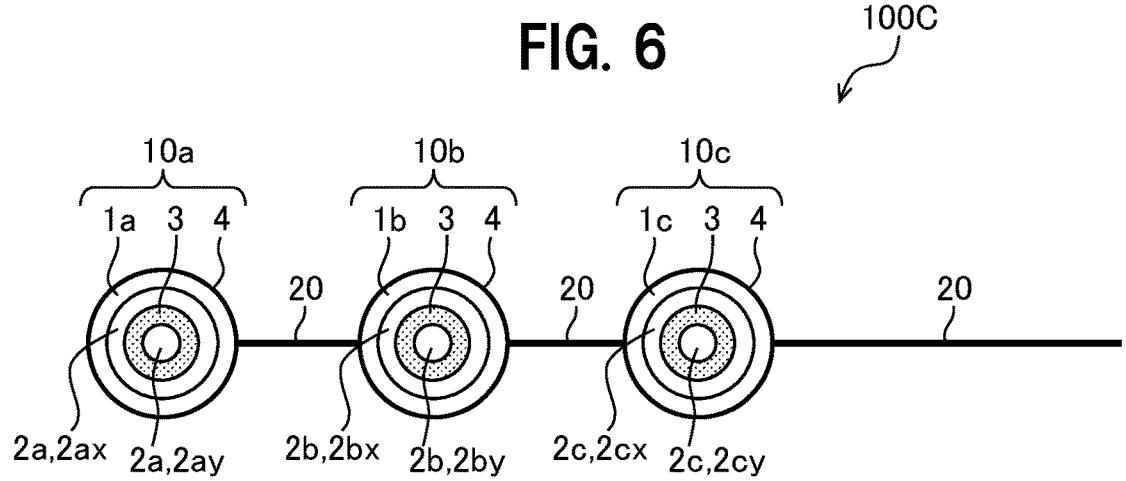
FIG. 6 is a diagram illustrating an example of a radiation detection unit in a radiation monitor and a method for measuring radiation according to a fourth embodiment.

FIG. 6 is a diagram showing an example of a radiation detection unit in a radiation monitor and a method for measuring radiation according to a fourth embodiment. A radiation monitor 100C of the fourth embodiment has a plurality of radiation detection units 10 shown in FIG. 4. The radiation monitor 100C has radiation detection units 10a, 10b, 10c which are connected in series by the optical fiber 20. To the radiation detection unit 10a, the radiation detection units 10b, 10c are the other radiation detection units.

The radiation detection unit 10a has a nested structure of a first light emitting element 1a, a second light emitting element 2ax, the compound part 3, and a second light emitting element 2ay, and the first light emitting element 1, the second light emitting element 2ax, and the compound part 3 are shaped like spherical shells. The second light emitting element 2ay may be shaped like either a spherical shell or a spherical solid.

The radiation detection unit 10b has a nested structure of a first light emitting element 1b, a second light emitting element 2bx, the compound part 3, and a second light emitting element 2by, and the first light emitting element 1, the second light emitting element 2bx, and the compound part 3 are shaped like spherical shells. The second light emitting element 2by may be shaped like either a spherical shell or a spherical solid.

The radiation detection unit 10c has a nested structure of a first light emitting element 1c, a second light emitting element 2cx, the compound part 3, and a second light emitting element 2cy, and the first light emitting element 1, the second light emitting element 2cx, and the compound part 3 are shaped like spherical shells. The second light emitting element 2cy may be shaped like either a spherical shell or The first light emitting element 1 (1a, 1b, 1c) and the second light emitting elements 2 (2a, 2b, 2c) used in each of the radiation detection units have different emission wavelengths from each other. The first light emitting elements 1a, 1b, 1c may have different emission wavelengths from one another, or may have the same emission wavelength. Similarly, the second light emitting elements 2 (2a, 2b, 2c) may have different emission wavelengths from one another, or may have the same emission wavelength.

When light emitting elements with different emission wavelengths are used, measuring a temporal change in the photon count rate of each emission wavelength allows measurement of charged particles at each of the locations where the first light emitting elements 1 are placed. Also, neutrons are measured at the locations where the second light emitting elements 2 are placed. In addition, placing a plurality of first light emitting elements 1 and a plurality of second light emitting elements 2 closely together improves efficiency of detecting charged particles and neutrons.

Fifth Embodiment

Figure 7:
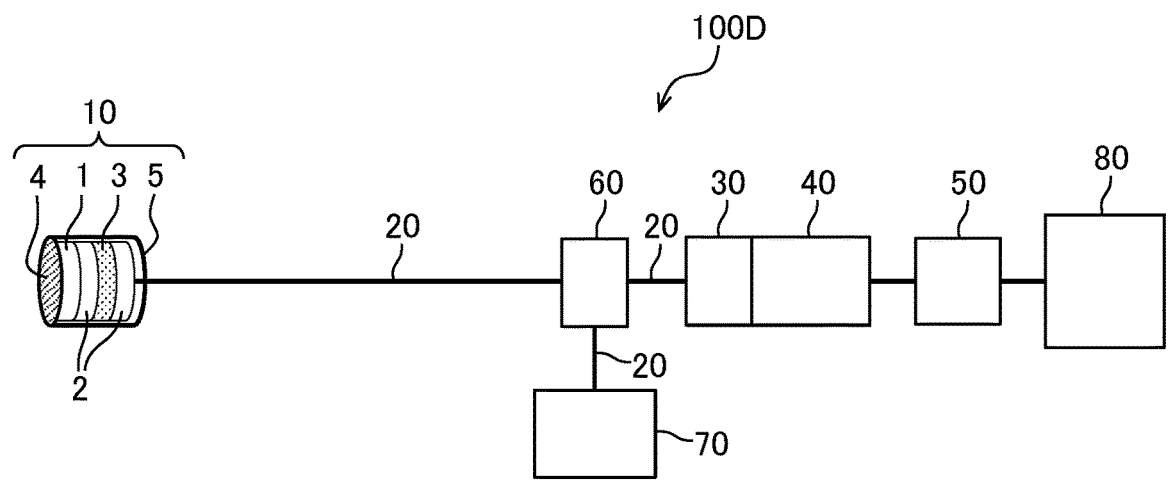
FIG. 7 is a diagram illustrating an example of a radiation monitor and a method for measuring radiation according to a fifth embodiment.

FIG. 7 is a diagram showing an example of a radiation monitor and a method for measuring radiation according to a fifth embodiment. Compared with the radiation monitor 100 of the first embodiment shown in FIG. 1, a radiation monitor 100D of the fifth embodiment additionally includes a light branching unit 60 and a light irradiation device 70. Repetitive descriptions are omitted by giving the same reference numerals to the elements that are the same as those in the first embodiment.

The light irradiation device 70, such as a laser, is connected to a branch of the optical fiber which is branched into two by the light branching unit 60 and light from a laser or the like is irradiated to the radiation detection unit 10. The first light emitting element 1 (radiation detecting element) and the second light emitting element 2 (radiation detecting element) of the radiation detection unit 10 emit light in response to not only radiation but also irradiation of light.

The wavelength of the light irradiated by the light irradiation device 70 is set to be different from the wavelengths of photons generated by irradiating light to the radiation light emitting element. The irradiated light causes that the radiation detecting element generates photons having the wavelength different from the wavelength of the irradiated light, in which a photon generation rate is proportional to the intensity of the irradiated light. It is possible to check whether the radiation light emitting element is operating in good condition by using a difference of temporal changes in the count rates, in which the temporal changes are measured when light is irradiated by the light irradiation device 70 such as a laser or the like and when light is not irradiated.

Sixth Embodiment

Figure 8:
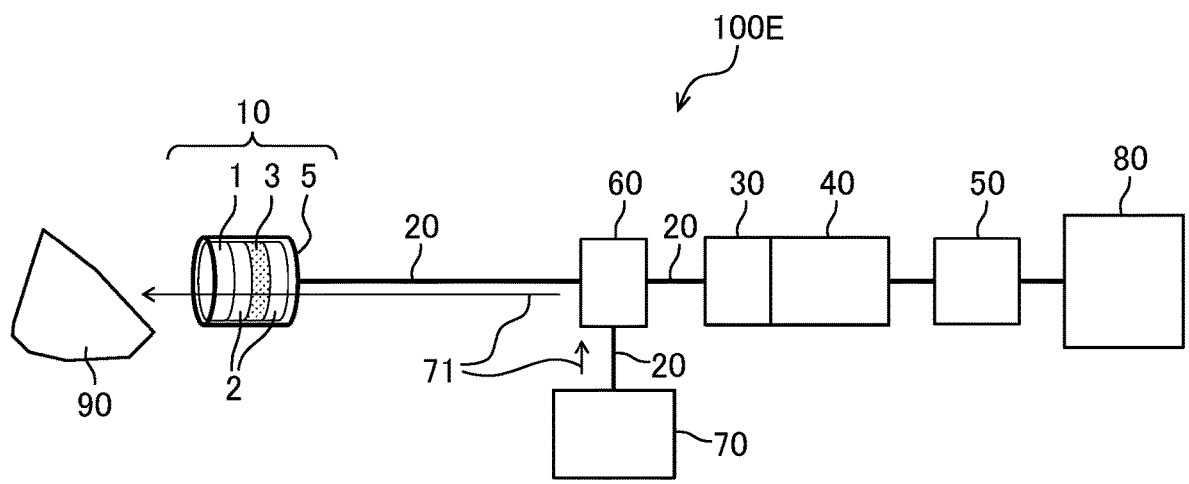
FIG. 8 is a diagram illustrating an example of a radiation monitor and a method for measuring radiation according to a sixth embodiment.

FIG. 8 is a diagram showing an example of a radiation monitor and a method for measuring radiation according to a sixth embodiment. A radiation monitor 100E of the sixth embodiment is different from the radiation monitor 100D of the fifth embodiment in irradiating a measurement target 90 being outside of the radiation detection unit 10. Repetitive descriptions are omitted by giving the same reference numerals to the elements that are the same as those in the first embodiment.

The light irradiation device 70, such as a laser, is connected to a branch of the optical fiber which is branched into two by the light branching unit 60. Light from the light irradiation device 70 is irradiated to the measurement target 90 outside the radiation detection unit 10 through the optical fiber 20 and the radiation detection unit 10. In the measurement target, light having a wavelength in accordance with the element of the measurement target 90 is emitted when light, such as a laser beam or the like, is irradiated. The measurement device 50 measures the emitted light through the radiation detection unit 10, the optical fiber 20, the wavelength differentiating unit 30, and the light detection unit 40. The element of the measurement target 90 is identified based on the count rate (or the count value) measured for each emission wavelength. If the measurement target 90 is in water, irradiating light, such as a laser beam or the like, turns the water into water vapor, water does not shield charged particles and the charged particles are measured by the radiation detection unit 10, in a case of charged particles emitting from the measurement target 90.

Lastly, the radiation monitor 100 of the first embodiment is described again.

The radiation monitor 100 shown in FIG. 1 has the radiation detection unit 10 at a tip end of the optical fiber 20. The first light emitting element 1 formed by addition of a rare-earth element to a ceramic matrix is placed at a tip end of the radiation monitor 100, and a surface for detecting radiation is shielded from light by using the light-shielding thin film 4.

The compound part 3 having compounds which generate charged particles in nuclear reactions with neutron is placed between the first light emitting element 1 and the optical fiber 20. The compounds are compounds of boron or lithium which are optically transparent (light with the wavelength of light emitted by the radiation light emitting elements goes through).

The second light emitting elements 2 (2x, 2y), which is formed by addition of a rare-earth element to a ceramic matrix and have different emission wavelengths from the wavelength of the first emitting element 1, are placed at the respective sides of the compound part 3, i.e., on the first light emitting element 1 side and on the optical fiber 20 side. The second light emitting element 2y on the optical fiber 20 side may be omitted. The first light emitting element 1, the second light emitting elements, and the compound part 3 are placed inside the radiation detection unit housing 5, except for the surface for detecting radiation (the surface of the first light emitting element 1 opposite from the optical fiber 20).

When a charged particle enters the first light emitting element 1, photons with the wavelength of the emission wavelength F1 are generated. The number of the photons is proportional to the energy given from the charged particle, in the radiation light emitting element. Since charged particles are shielded by the first light emitting element 1, the charged particle does not enter second light emitting element 2. Also, since charged particles are shielded by the radiation detection unit housing 5, the charged particle does not enter the first light emitting element 1 and the second light emitting elements 2 through the radiation detection unit housing 5.

Meanwhile, neutrons easily pass through the first light emitting element 1 and the radiation detection unit housing 5. Therefore a neutron enters the compound part 3, resulting in generating a charged particle. The charged particle generated enters the second light emitting element 2, resulting in generating photons with the wavelength of the emission wavelength F2. The number of the photons is proportional to the energy given from the charged particle, in the second light emitting element 2.

The photons generated by the first light emitting element 1 and the second light emitting element 2 are sent to the wavelength differentiating unit 30 formed by a wavelength-selective filter, a spectroscope, or the like through the optical fiber 20. Photons differentiated by using wavelengths by the wavelength differentiating unit 30 are converted into electric signals by the light detection unit 40 which is formed by a photomultiplier tube, a photo diode or the like and is placed at a stage after the wavelength differentiating unit 30. The measurement device 50 measures count rates of the electric signals for each wavelength.

The inventors have found by experiment that a count rate of each and every photon and an absorbed dose rate in the light emitting element have a one-to-one relation. The absorbed dose rates of gamma rays are smaller than the absorbed dose rates of charged particles by several digits or more. When a dose rate is constant, there is almost no temporal change in the count rate, and the count rate is almost constant. Then, when a charged particle enters, the absorbed dose rate drastically increases, which causes a drastic increase in the count rate, and the count rate returns to what it was before the entrance of the charged particles in a period of time which is approximately several times the light attenuation constant of the radiation light emitting element.

Measuring a temporal change of such an increase and a decrease allows measurement of each and every charged particle. Neutrons are measured indirectly by detecting charged particles generated in nuclear reactions with neutrons, in the same manner as the detection of charged particles. Charged particles are measured based on temporal changes in the count rates regarding the emission wavelength F1, and neutrons are measured based on temporal changes in the count rates regarding the emission wavelength F2. Moreover, air dose rates are measured based on the count rates regarding the emission wavelength F1 or the emission wavelength F2.

The present invention is applicable to remote and easy measurement of air dose rates, charged particles, and neutrons in places such as a spent fuel pool in a nuclear power plant, inside and outside a nuclear reactor pressure vessel, inside and outside a nuclear reactor containment vessel, inside and outside a suppression pool, inside and outside a reactor building, a reprocessing facility, a hospital, and a research laboratory.

REFERENCE SIGNS LIST 1, 1a, 1b, 1c first light emitting element
2, 2a, 2b, 2c second light emitting element
3 compound part
4 light-shielding thin film
5 radiation detection unit housing
10, 10a, 10b, 10c radiation detection unit
20 optical fiber (photon transmission unit)
30 wavelength differentiating unit
40 light detection unit
50 measurement device
60 light branching unit
70 light irradiation device
80 analysis and display device
90 measurement target
100, 100A, 100B, 100C, 100D, 100E radiation monitor

What is claimed is:

1. A radiation monitor comprising
a radiation detection unit configured to detect radiation;
a photon transmission unit configured to transmit a photon emitted from a light emitting element of the radiation detection unit;
a wavelength differentiating unit configured to differentiate a photon by using a wavelength of the photon from the photon transmission unit;
a light detection unit configured to convert the photon differentiated by the wavelength differentiating unit to an electric pulse;
a measurement device configured to measure radiation based on a count rate of the electric pulse;
a light branching unit located between the photon transmission unit and the wavelength differentiating unit; and
a light irradiation device located on a branch side branched off by the light branching unit;
wherein the radiation detection unit comprises:
a first light emitting element configured to generate a photon in response to incident radiation;
a compound part including a compound configured to generate a charged particle in a nuclear reaction with an incident neutron; and
a second light emitting element located between the first light emitting element and the compound part and configured to generate a photon in response to radiation,
wherein the wavelength of the photon generated by the first light emitting element and the wavelength of the photon generated by the second light emitting element are different from each other,
wherein the measurement device measures at least one selected from a group consisting of an air dose rate, a charged particle and a neutron, based on changes of photon count rates of different wavelengths over time, and
wherein the light irradiation unit generates light irradiated to the radiation detection unit via the light branching unit through the photon transmission unit.

2. The radiation monitor according to claim 1,
wherein the first light emitting element, the second light emitting element and the compound part compose a nested structure, and
wherein the first light emitting element, the second light emitting element and the chemical compound part each have a spherical shell shape.

3. The radiation monitor according to claim 1,
wherein the compound contains boron or lithium which is optically transparent.

4. The radiation monitor according to claim 1,
wherein the radiation monitor further comprises another radiation detection unit which is different from the radiation detection unit, and
wherein the radiation detection unit and the another radiation detection unit are connected with the photon transmission unit.

5. The radiation monitor according to claim 4,
wherein respective light emitting wavelengths of all light emitting elements of the radiation detection unit and the another radiation detection unit are different, or, some of the light emitting wavelengths of the light emitting elements are the same and the other light emitting wavelengths of the light emitting elements are different.

6. The radiation monitor according to claim 1,
wherein respective thicknesses of the first light emitting element and the second light emitting element are substantially equal to the ranges of charged particles to be measured, and
wherein the ranges of charged particles are ranges in radiation light emitting elements.

7. The radiation monitor according to claim 1,
wherein a thickness of the second light emitting element is substantially equal to the range of the charged particle generated in the compound part, and
wherein the range of the charged particle is range in the light emitting element.

8. The radiation monitor according to claim 2,
wherein respective thicknesses of the first light emitting element and the second light emitting element with spherical shell shape are substantially equal to the range of the charged particle to be measured, and
wherein the range of the charged particle is range in the light emitting element.

9. The radiation monitor according to claim 1,
wherein the compound is a transparent compound of boron or lithium, and
wherein the compound contains any one of boron nitride, borosilicate glass, and lithium fluoride.

10. The radiation monitor according to claim 1,
wherein the light irradiation device generates light having a wavelength different from wavelengths of the light emitting from the first light emitting element and the second light emitting element.

11. The radiation monitor according to claim 1,
wherein the light irradiation device generates light irradiated to the measurement target through the radiation detection unit, and
wherein the measurement target is located outside of the radiation detection unit.

12. The radiation monitor according to claim 1,
wherein the first light emitting element and the second light emitting element employ a radiation detecting element containing a ceramic matrix material of yttrium aluminum garnet with an addition of a rare-earth element such as ytterbium, neodymium, cerium and praseodymium.

13. A method for measuring radiation by using a radiation monitor, the method comprising:
detecting radiation, by a radiation detection unit;
transmitting, by a photon transmission unit, a photon emitted from a light emitting element of the radiation detection unit;
disposing a light irradiation device located on a branch side branched off by the light branching unit;
differentiating, by a wavelength differentiating unit, a wavelength from the photon transmission unit;
disposing a light branching unit between the photon transmission unit and the wavelength differentiating unit;
converting, by a light detection unit, a photon differentiated by the wavelength differentiating unit to an electric pulse;
measuring, by a measurement device, radiation based on a count rate of the electric;
generating, by a first light emitting element, a photon in response to incident radiation;
generating, by a compound part a charged particle in a nuclear reaction with an incident neutron; and
generating, by a second light emitting element located between the first light emitting element and the compound part, a photon in response to radiation,
wherein the wavelength of the photon generated by the first light emitting element and the wavelength of the photon generated by the second light emitting element are different from each other,
wherein the measurement device measures at least one selected from a group consisting of an air dose rate, a charged particle and a neutron, based on changes of photon count rates of different wavelengths over time,
wherein the light irradiation unit generates light irradiated to the radiation detection unit via the light branching unit through the photon transmission unit.

* * * * *